United States Patent
Stretch et al.

(10) Patent No.: US 6,837,350 B2
(45) Date of Patent: *Jan. 4, 2005

(54) LIGHTWEIGHT MAGNETIC PARTICLE DEVICE

(75) Inventors: Dale A. Stretch, Novi, MI (US); Wade A. Smith, Mayville, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/401,320

(22) Filed: Mar. 27, 2003

(65) Prior Publication Data

US 2003/0226731 A1 Dec. 11, 2003

Related U.S. Application Data

(63) Continuation-in-part of application No. 09/702,949, filed on Oct. 31, 2000, now Pat. No. 6,581,739.

(51) Int. Cl.[7] .............................................. F16D 37/02
(52) U.S. Cl. ..................................... 192/21.5; 192/58.4
(58) Field of Search ............................. 192/21.5, 52.4, 192/58.4, 84.3, 84.31, 84.1, 84.2, 84.21

(56) References Cited

U.S. PATENT DOCUMENTS

| | | | |
|---|---|---|---|
| 1,823,334 A | 9/1931 | Payne | |
| 2,519,449 A | 8/1950 | Findley et al. | |
| 2,573,065 A | 10/1951 | Salemme | |
| 2,575,360 A | 11/1951 | Rabinow | |
| 2,601,076 A | 6/1952 | Winther et al. | |
| 2,604,964 A | 7/1952 | Winther et al. | |
| 2,615,945 A | 10/1952 | Jaeschke | |
| 2,622,713 A | 12/1952 | Rabinow | |

(List continued on next page.)

FOREIGN PATENT DOCUMENTS

GB 693955 7/1953
JP 56-14629 A B1 2/1981

OTHER PUBLICATIONS

European Search Report, 3 pages.

*Primary Examiner*—Saul Rodriguez
(74) *Attorney, Agent, or Firm*—Rader, Fishman & Grauer PLLC

(57) ABSTRACT

A multiple working surface magnetic particle device for transferring torque between two rotatable members is disclosed. The magnetic particle device includes relatively rotatable members defining a gap therebetween containing a magnetically reactive medium. The magnetically reactive medium stiffens in the presence of a magnetic field interlocking the rotatable members. The multiple working surface design allows for a reduction in the size and weight of the magnetic field source resulting in a more compact, lighter weight magnetic particle device.

11 Claims, 9 Drawing Sheets

U.S. PATENT DOCUMENTS

| | | |
|---|---|---|
| 2,625,037 A | 1/1953 | Winther |
| 2,629,471 A | 2/1953 | Rabinow |
| 2,631,705 A | 3/1953 | Winther |
| 2,685,947 A | 8/1954 | Votrian |
| 2,693,261 A | 11/1954 | Winther |
| 2,718,946 A | 9/1955 | Winther |
| 2,725,133 A | 11/1955 | Winther |
| 2,738,044 A | 3/1956 | Winther |
| 2,738,449 A | 3/1956 | Mason |
| 2,772,762 A | 12/1956 | Gamundi et al. |
| 2,818,148 A | 12/1957 | Winther |
| 2,822,070 A | 2/1958 | Jaeschke |
| 2,832,449 A | 4/1958 | Winther |
| 2,878,913 A | 3/1959 | Jaeschke |
| 2,885,044 A | 5/1959 | Jaeschke |
| 2,905,293 A | 9/1959 | Winther |
| 2,921,657 A | 1/1960 | Winther |
| 2,925,896 A | 2/1960 | Jaeschke |
| 3,055,470 A | 9/1962 | Pierce |
| 3,088,565 A | 5/1963 | Jaeschke |
| 3,208,567 A | 9/1965 | Metzger |
| 3,216,542 A | 11/1965 | Comstock |
| 3,263,784 A | 8/1966 | Pierce |
| 3,358,798 A | 12/1967 | Janson |
| 3,394,784 A | 7/1968 | Searle |
| 3,450,238 A | 6/1969 | Adkins |
| 3,620,335 A | 11/1971 | Hendershot |
| 3,672,476 A | 6/1972 | Hendershot |
| 3,899,061 A | 8/1975 | Krug |
| 4,509,091 A | 4/1985 | Booth |
| 4,624,354 A | 11/1986 | Koitabashi |
| 4,649,458 A | 3/1987 | Arai et al. |
| 4,682,676 A | 7/1987 | Murata |
| 4,967,887 A | 11/1990 | Annacchino et al. |
| 5,713,444 A | 2/1998 | Schroeder |
| 5,803,219 A | 9/1998 | Ogawa |
| 5,847,478 A | 12/1998 | Usui et al. |
| 5,934,429 A | 8/1999 | Jennings |
| 5,967,273 A | 10/1999 | Hampton |
| 6,032,772 A | 3/2000 | Moser et al. |
| 6,290,043 B1 | 9/2001 | Ginder et al. |
| 6,581,739 B1 * | 6/2003 | Stretch et al. ............. 192/21.5 |
| 6,619,453 B2 * | 9/2003 | Stretch ..................... 192/21.5 |

* cited by examiner

LIGHTWEIGHT MAGNETIC PARTICLE DEVICE

RELATED APPLICATIONS

This application is a Continuation-in-Part of U.S. patent application Ser. No. 09/702,949, entitled LIGHTWEIGHT MAGNETIC PARTICLE DEVICE, filed Oct. 31, 2000 now U.S. Pat. No. 6,581,739, the disclosure of which is incorporated herein by reference in its entirety.

FIELD OF THE INVENTION

The present invention relates generally to magnetic torque-transferring devices and more particularly to those that employ a magnetically reactive medium for coupling together two relatively rotatable members.

BACKGROUND OF THE INVENTION

Magnetic particle devices are known in the art. Generally, magnetic particle devices are based on electromagnetic and mechanical forces that act on a magnetically reactive medium disposed between the working surfaces of a driven member and driving member. The magnetic forces operate to increase the viscosity of the medium to interlock the driven and driving members. Magnetic particle devices are often designed as quick-acting electrically activated brakes or clutches for the transmission of torque. Alternatively, magnetic particle devices may be designed to impart drag between rotatable surfaces to maintain tension.

Where magnetic particle devices offer many advantages, such as low vibration torque transfer, the ability to operate in the slip condition, and the controllability of torque transfer over a relatively wide range of electrical input, there is a drawback as well. Conventional magnetic particle devices are relatively heavy due to the use of electromagnets as the source of a magnetic field. Known electromagnets generally comprise a shell with known magnetic properties and a coil of conductive wire. The thickness of the shell serves to define the working surface area of the device. Since the working surface is actually being coupled due to the increased viscosity of the magnetically reactive medium, an efficient design is one that maximizes the working surface area. Unfortunately, to increase working surface area in a conventional device, the thickness of the electromagnet shell must be increased, thereby undesirably increasing the weight.

Accordingly, there exists a need for a lightweight magnetic particle device that does not compromise working surface area or reduce operating life. The present invention provides an effective lightweight magnetic particle device wherein the reduction in weight is achieved without sacrificing working surface area or adversely affecting the operative life.

SUMMARY OF THE INVENTION

The present invention recognizes the disadvantages and limitations commonly associated with the operation of conventional magnetic particle devices. By constructing a magnetic particle device in accordance with an aspect of the current invention, the weight of the magnetic particle device can be significantly reduced without adversely affecting the operating life of the device.

A multiple working surface magnetic particle device for transferring torque between two rotatable members is disclosed. The magnetic particle device comprises relatively rotatable members defining a gap therebetween containing a magnetically reactive medium. The magnetically reactive medium stiffens in the presence of a magnetic field interlocking the rotatable members. In an embodiment of the invention, the rotatable members include include regions of relatively high and low magnetic permeability positioned to create multiple working surfaces through which magnetic flux weaves to activate the magnetically reactive medium. The multiple working surface design allows for a reduction in the size and weight of the magnetic field source resulting in a more compact, lighter weight magnetic particle device.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
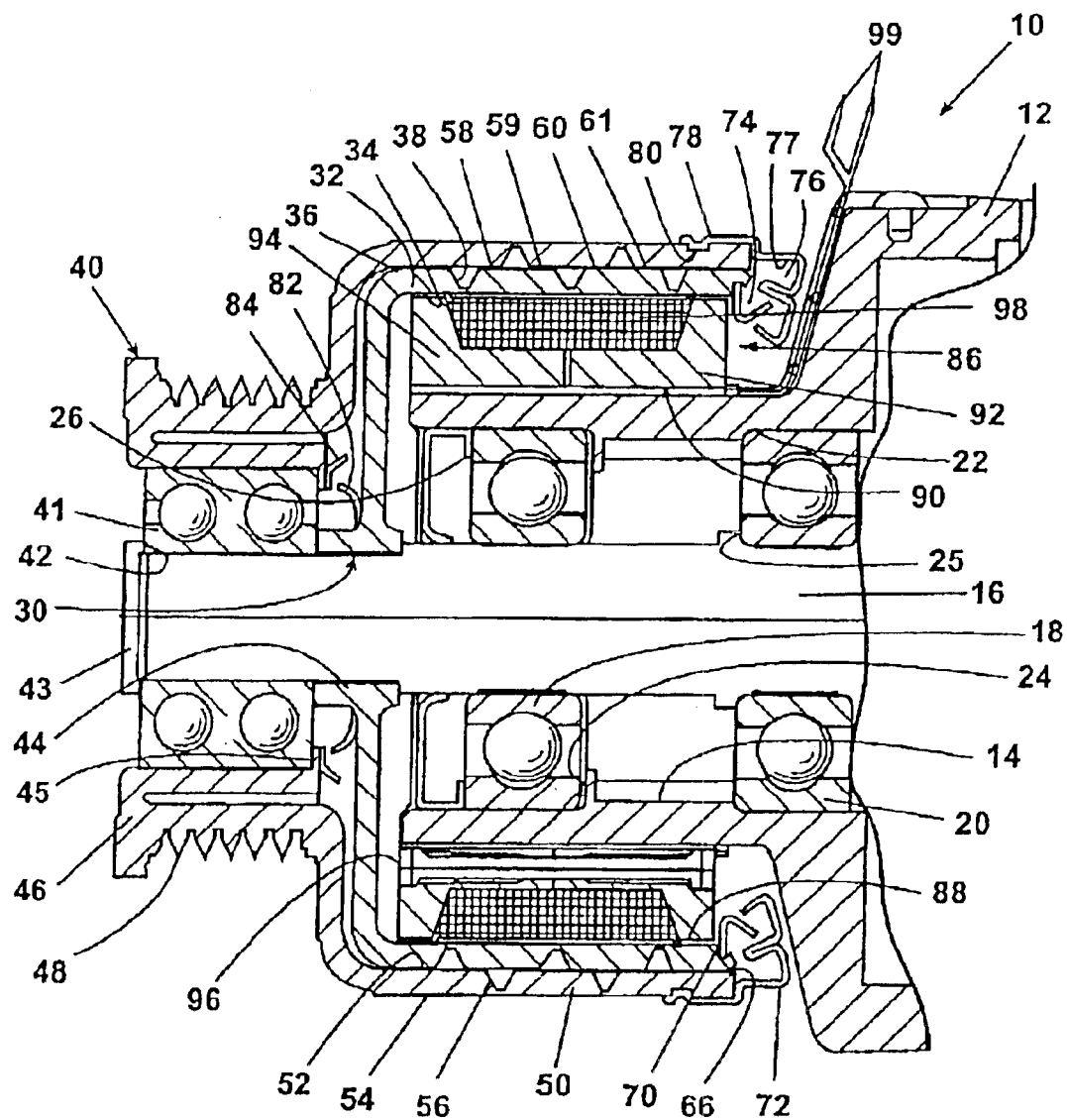
FIG. 1 is a cross-sectional view of a magnetic particle device according to an embodiment of the present invention.

Referring to FIG. 1, an embodiment of a magnetic particle device 10 in accordance with the principles of the present invention is shown. The device 10 includes a stationary housing member 12 having a duct 14 therethrough for receiving a rotatable shaft 16. Shaft 16 is rotatably supported within duct 14 by bearings 18 and 20 the positions of which are determined by shoulders 22 and 24 that are formed within duct 14 of housing member 12 and shoulder 25 formed on shaft 16. Bearing 18 is biased against shoulder 24 by an annular retainer member 26. Bearing 20 is biased against shoulder 22 by a biasing member (not illustrated) in a device that is driven by the magnetic particle device 10.

Figure 5:
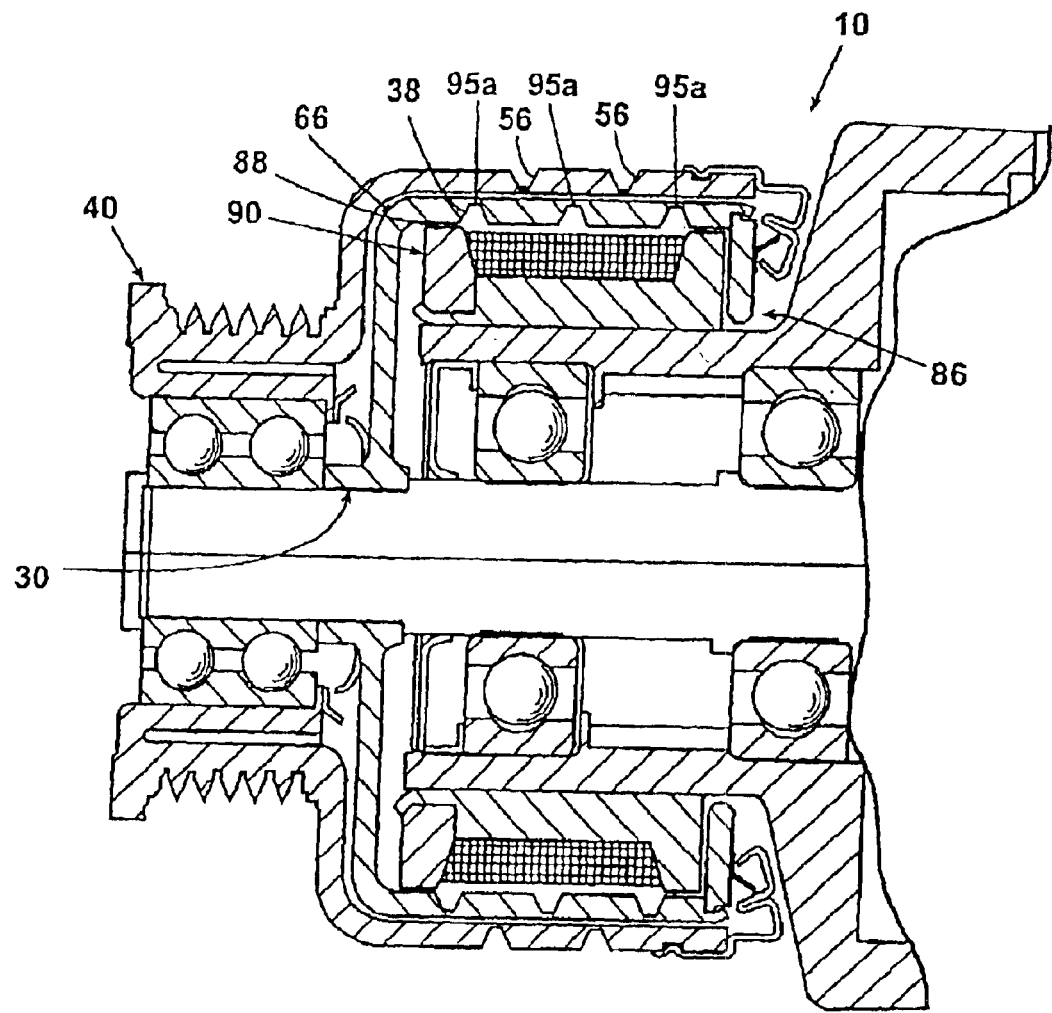
FIG. 5 is a cross-sectional view of another embodiment of a magnetic particle device.
Figure 6:
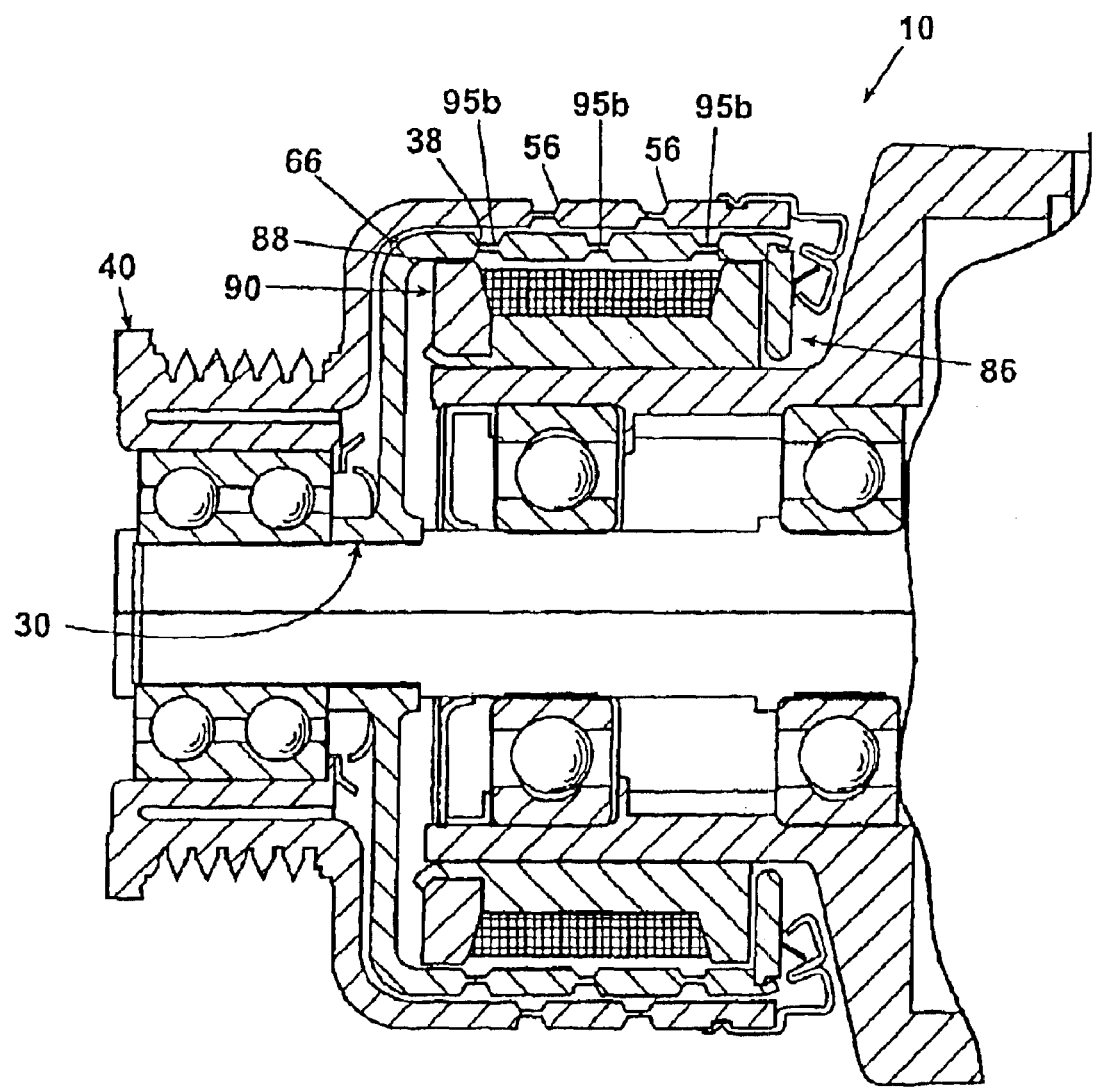
FIG. 6 is a cross-sectional view of another embodiment of a magnetic particle device.

A first rotatable member 30 of known magnetic properties is fixedly secured to shaft 16. First rotatable member 30 includes a cylindrical portion 32 located radially outwardly of shaft 16 such that cylindrical portion 32 is substantially parallel with shaft 16. Cylindrical portion 32 includes an inner surface 34 and an outer surface 36. Outer surface 36 includes a plurality of grooves 38, depicted in the FIG. 1 as generally trapezoidal in cross-section, but not intended to be limited thereto. Grooves 38 can also, in the alternative, be located on inner surface 34 or located on both inner surface 34 and outer surface 36 of cylindrical portion 32, as seen in FIGS. 5 and 6 and explained in further detail below.

A second rotatable member 40 of known magnetic properties is supported on shaft 16 by a bearing 41, the position of which is determined by a shoulder 42 located on a distal end 43 of shaft 16 and a foot 44 of first rotatable member 30. Second rotatable member 40 is positioned on bearing 41 by a shoulder 45 located on a base 46 of second rotatable member 40. Base 46 further includes a plurality of teeth 48 for engaging the underside of a typical drive belt (not illustrated) found in automotive applications. While the present invention describes a magnetic particle device driven by a belt, it is understood that other suitable mechanisms may be employed to drive the device.

Second rotatable member 40 further includes a cylindrical portion 50 located radially outwardly of cylindrical portion 32 of first rotatable member 30 and substantially parallel to shaft 16. Cylindrical portion 50 further includes an inner surface 52 and an outer surface 54.

Figure 2:
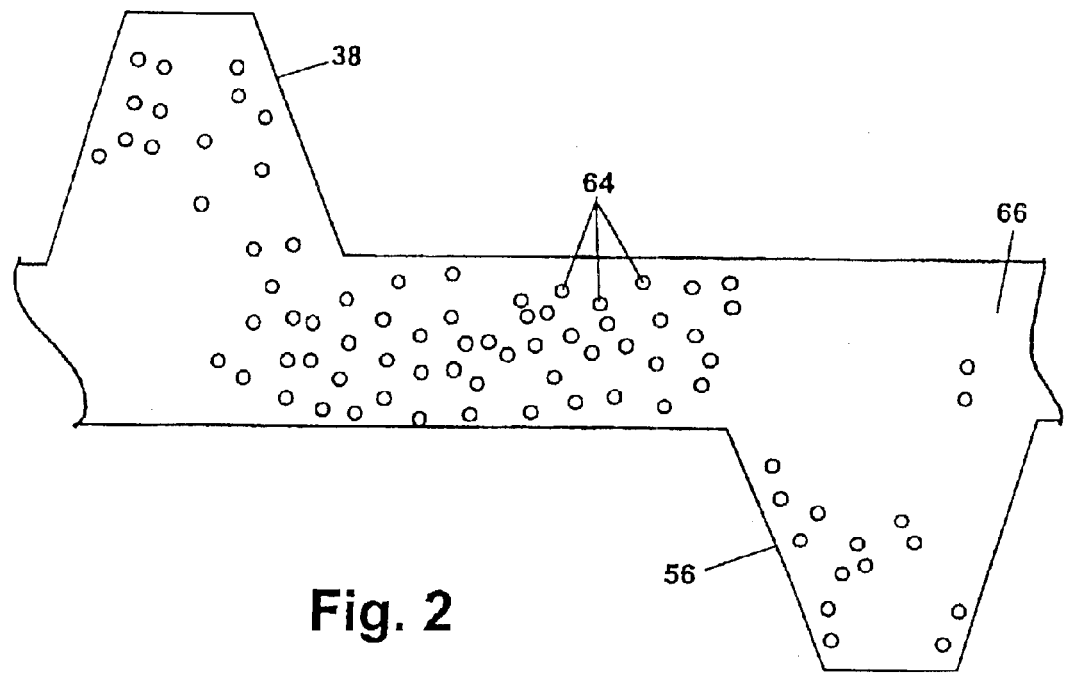
FIG. 2 is an enlarged cross-sectional view of a magnetic particle gap according to the embodiment of FIG. 1, with no magnetic flux applied across the gap.

Inner surface 52 further includes a plurality of grooves 56, depicted in the FIG. 1 as generally trapezoidal in cross-section, but not intended to be limited thereto. Grooves 56 can also, in the alternative, be located on outer surface 54 or located on both inner surface 52 and outer surface 54 of cylindrical portion 50, as seen in FIGS. 5 and 6 and explained in further detail below. Grooves 56 are positioned on inner surface 52 such that grooves 56 are located radially outwardly of a point equidistantly between grooves 38 in first rotatable member 30. Grooves 38 on cylindrical portion 32 and grooves 56 on cylindrical portion 50 define therebetween a plurality of working surfaces 58, 59, 60 and 61. Working surfaces 58, 59, 60 and 61 cooperate with a magnetically reactive medium 64 (as best seen in FIG. 2) to interlock first rotatable member 30 and second rotatable member 40 when magnetically reactive medium 64 is subjected to a magnetic field.

Figure 4:
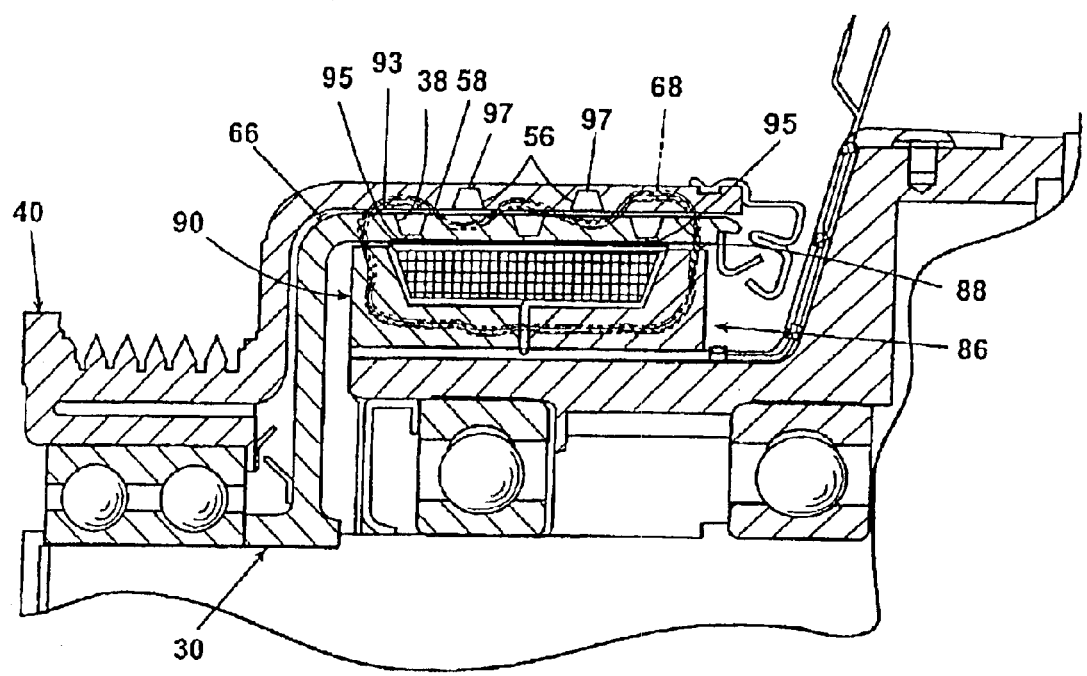
FIG. 4 is an enlarged cross-sectional view of the interface of the electromagnetic and the first and second rotatable members according to the embodiment of FIG. 1, showing a path of the magnetic flux.

First rotatable member 30 and second rotatable member 40 are not in contact, but define therebetween a uniform gap 66, generally toroidal in configuration. Gap 66 is of a predetermined width to permit a thin layer of magnetically reactive medium 64 (as seen in FIG. 2), such as a magnetically reactive powder, to reside therein. A magnetically reactive powder is the preferred medium because it has the advantage of being resistant to temperature levels that would degrade oil based magnetorheological fluids. Grooves 38 in first rotatable member 30 and grooves 56 in second rotatable member 40 serve the purpose of providing additional physical volume for receiving magnetically reactive medium 64 when no magnetic field is applied. Removing magnetically reactive powder 64 from gap 66 when no magnetic field is applied decreases friction thereby reducing drag between first rotatable member 30 and second rotatable member 40. In addition, grooves 38 and 56 aid in concentrating the lines of magnetic flux 68 across gap 66 and substantially through working surfaces 58, 59, 60 and 61 as seen in FIG. 4.

As illustrated in FIG. 1, two non-contacting sealing members 70 and 72 cooperate between cylindrical portion 32 and cylindrical portion 50 to impede the escape of magnetically reactive medium 64. This type of "labyrinth" seal is effective to retain a magnetically reactive powder within gap 66. Sealing members 70 and 72 include cavities 74 and 76 respectively. During application of a magnetic field when both rotatable members 30 and 40 are interlocked, centrifugal forces pull the magnetically reactive medium 64 in cavities 74 and 76 to the outer surface 77 of cavity 76 whereby the centrifugal forces and magnetic flux pull the powder into gap 66. When no magnetic field is applied to device 10, the magnetically reactive powder is allowed to disseminate into cavities 74 and 76, but is substantially prevented from exiting cavity 74 due to the labyrinth geometry of the interacting sealing members 70 and 72. Sealing member 72 further includes a cylindrical retaining portion 78 that cooperates with an annular seat 80 in second rotatable body 40 to retain sealing member 72. Similar non-contacting annular sealing members 82 and 84 are fixedly attached to first rotatable member 30 and second rotatable member 40 respectively. Sealing members 82 and 84 cooperate to impede the escape of magnetically reactive medium 64 in substantially the same manner as sealing members 70 and 72.

Figure 1A:
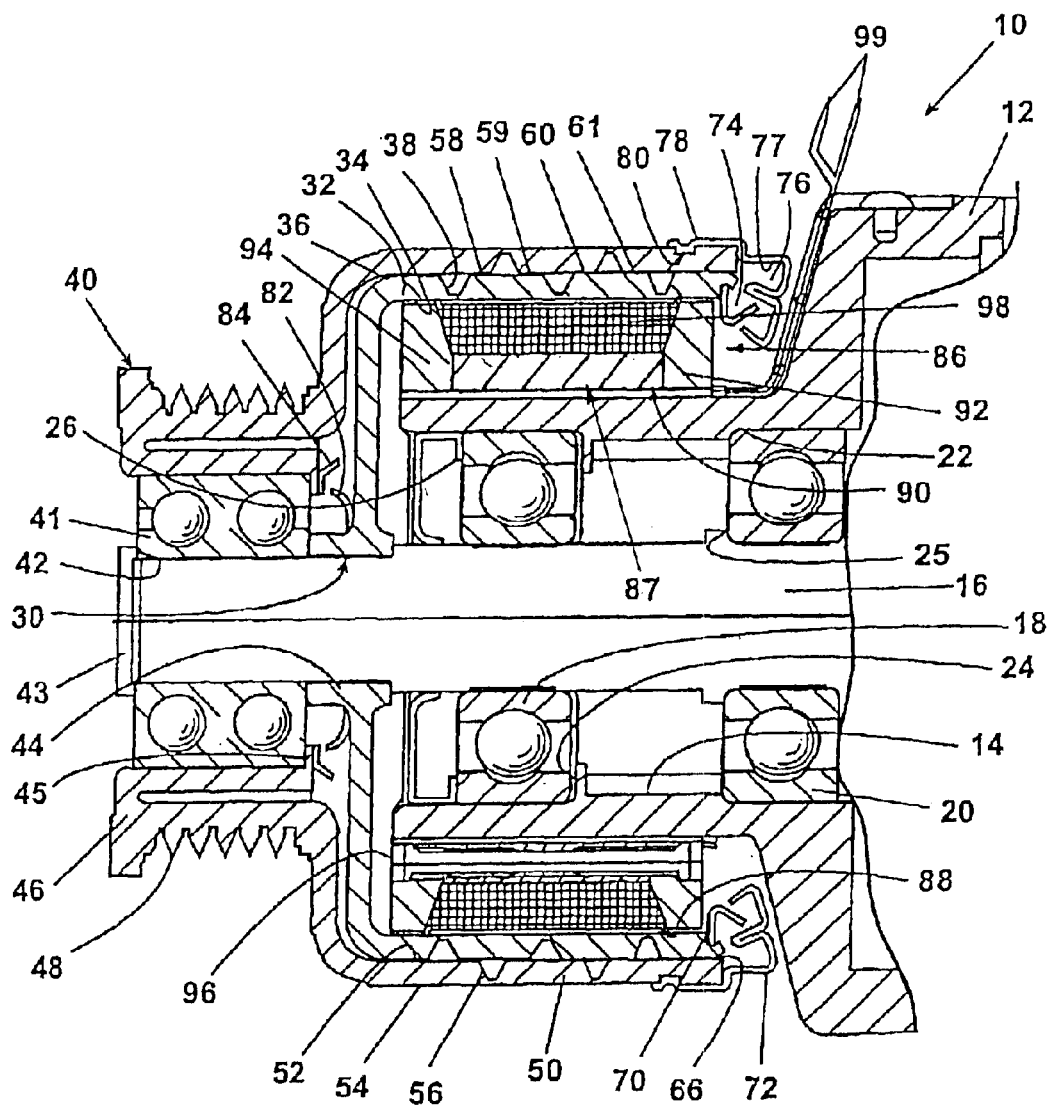
FIG. 1A is a cross-sectional view of a magnetic particle device according to another embodiment of the present invention.

Magnetic particle device 10 further requires a source of magnetic flux, such as a magnet. As shown in FIGS. 1 and 4, a stationary toroidal electromagnet 86 is mounted on the outside of housing member 12 between first rotatable member 30 an housing member 12. In the alternative, the magnetic source may be a permanent magnet 87 supplemented by a counteracting electromagnet 86, as shown in FIG. 1A, so that magnetic particle device 10 will default to being engaged should electromagnet 86 fail. Also in the alternative, the magnetic source may be mounted on outer surface 54 of second rotatable member 40.

First rotatable member 30 and electromagnet 86 are not in contact, but define therebetween a uniform gap 88, generally toroidal in configuration. Electromagnet 86 includes a rigid shell 90, shown as being C-shaped in cross-section, opening to the outside of the toroid and having known magnetic properties. Rigid shell 90 is shown as comprising two annular elements 92 and 94 joined by a plurality of fasteners 96. In the alternative, rigid shell 90 could comprise a number of annular elements cooperating to define the C-shaped geometry of the rigid shell as seen in FIG. 5. Electromagnet 86 further includes a typical coil of conductive wire 98, application of an electric current to the coil generating a known electromagnetic field in the vicinity of electromagnet 86. Electromagnet 86 is controlled by an electronic controller (not illustrated) designed to provide an electrical current to the coil via wires 99 under predetermined conditions. The controller processes all input, being sensor readings or operator selections, to determine the appropriate current level needed by electromagnet 86 to generate the magnetic field so that the magnetically reactive medium 64 locks into chains to achieve the desired transfer of torque within the device 10.

FIG. 2 shows magnetically reactive medium 64 disposed in gap 66 without application of a magnetic field. In this state, no appreciable torque is transferred between first rotatable member 30 and second rotatable member 40. Second rotatable member 40 is thus free to rotate relative to first rotatable member 30.

It is well known in the art that lines of magnetic flux 68 travel a path substantially through structures with known magnetic properties. As seen in FIG. 4, upon application of a magnetic field in the vicinity of electromagnet 86, lines of magnetic flux 68 exit rigid shell 90 in electromagnet 86 and traverse gap 88, whereby flux 68 saturates areas 95 located radially inwardly of grooves 38 in first rotatable member 30. Upon saturation of areas 95, lines of magnetic flux 68 follow a path of least resistance and traverse gap 66, through working surfaces 93, into second rotatable member 40. The narrowest width of grooves 38 is best designed to be greater than the width of gap 66 thus preventing flux 68 from traversing grooves 38. Upon entry into second rotatable member 40, flux 68 saturates areas 97 located radially outwardly of grooves 56. Upon saturation of areas 97, flux 68 traverses gap 66 through working surfaces 58, into first rotatable member 30. The process of traversing gap 66 is repeated until the number of grooves 38 and 56 are exhausted. The flux path is completed as flux 68 traverses gap 66 and gap 88 and reenters rigid shell 90 of electromagnet 86.

Figure 3:
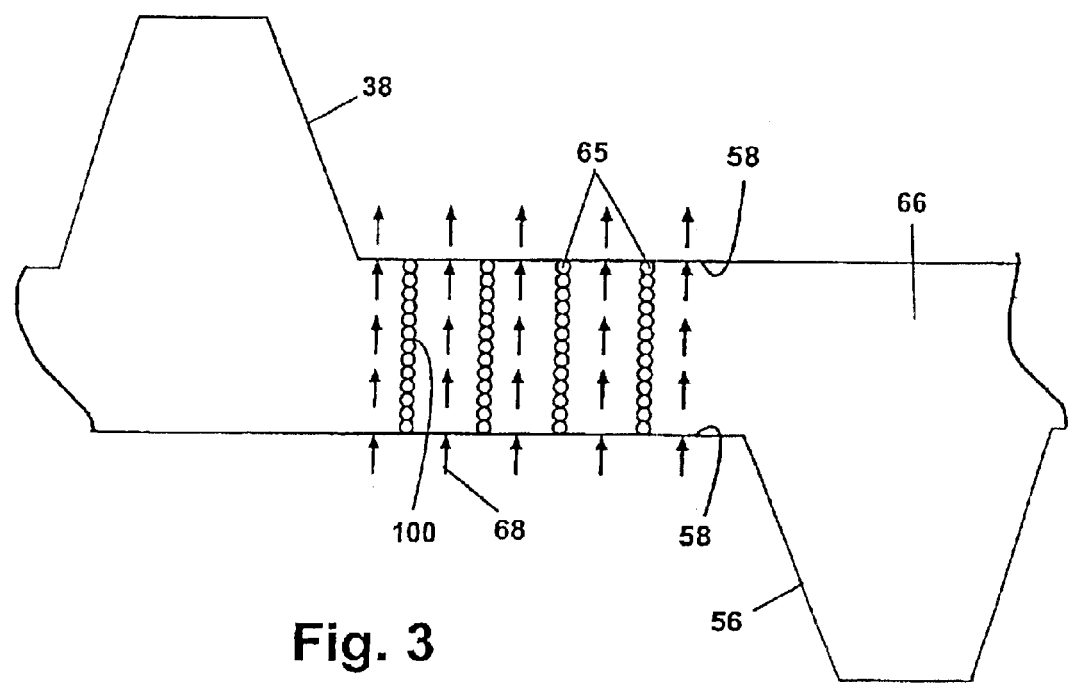
FIG. 3 is an enlarged cross-sectional view of a magnetic particle gap according to the embodiment of FIG. 1, with magnetic flux applied across the gap.

As seen in FIG. 3, magnetically reactive particles 65 in magnetically reactive medium 64 change formation, in relation to the intensity of the magnetic field, by aligning with the lines of magnetic flux 68 as flux 68 traverses gap 66 through working surfaces 58. Magnetically reactive particles 65 under the influence of a magnetic field will lock into chains 100 increasing the shear force and creating a mechanical friction against the working surfaces 58 facing gap 66. The increased shear force and mechanical friction result in a corresponding transfer of torque between first member 30 and second member 40.

FIGS. 5 and 6 illustrate two variations of the embodiment of FIG. 1 depicting a modified groove arrangement. Both embodiments operate in a manner substantially similar to the embodiment of FIG. 1. In both embodiments, lines of magnetic flux 68 (not illustrated) generated by electromagnet 86 first exit rigid shell 90 and travel a path across gap 88 into first rotatable member 30. As seen in FIG. 5, upon entry into first rotatable member 30, flux 68 saturates areas 95a. Upon saturation, flux 68 follows the next path of least resistance and traverses gap 66 into second rotatable member 40. As seen in FIG. 6, upon entry into first rotatable member 30, flux 68 saturates areas 95b. Upon saturation, flux 68 follows the next path of least resistance and traverses gap 66 into second rotatable member 40. The embodiments in FIGS. 5 and 6 differ from the embodiment of FIG. 1 in that the capacity to store magnetically reactive medium 64 in grooves 38 and 56 is substantially or totally reduced, resulting in more medium 64 in gap 66. The increased amount of medium 64 in gap 66 increases the drag against second rotatable member 40 as member 40 rotates about first rotatable member 30 when the electromagnet is not energized.

Figure 7:
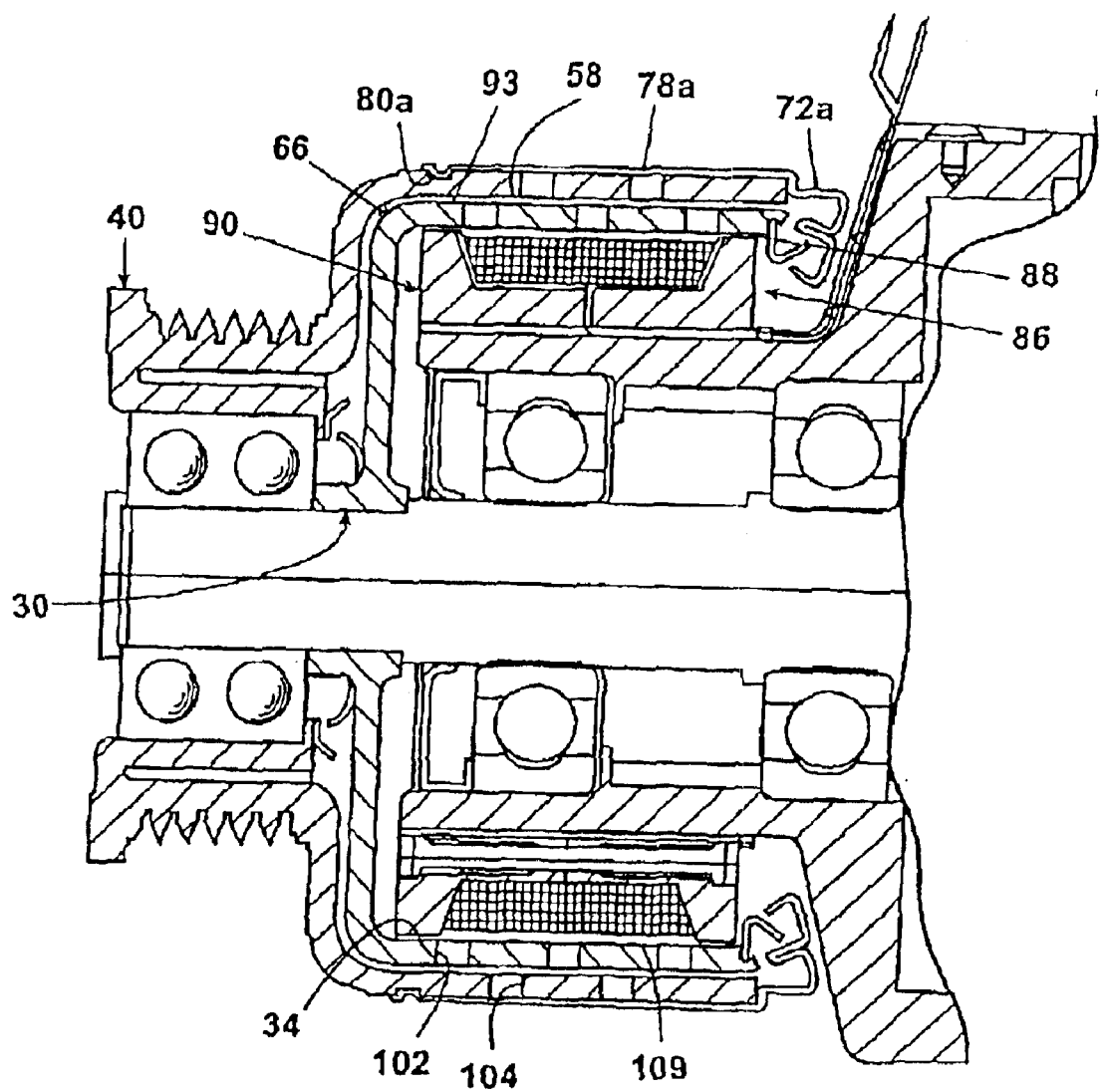
FIG. 7 is a cross-sectional view of another embodiment of a magnetic particle device.
Figure 8:
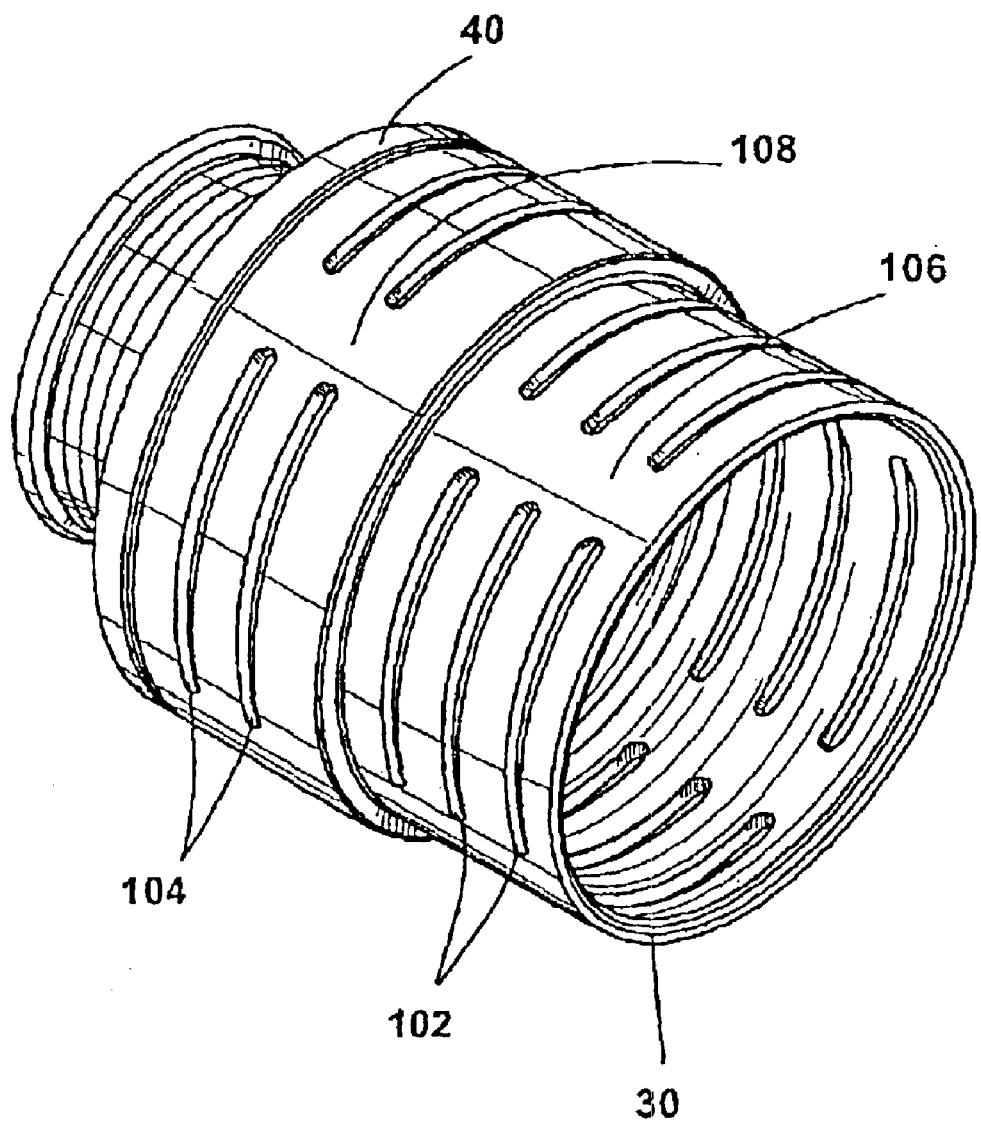
FIG. 8 is an exploded view of the first and second rotatable members as described in the embodiment shown in FIG. 7.

FIG. 7 is a cross-sectional view of a fourth embodiment of the present invention. In this embodiment, the first rotatable member 30 and second rotatable member 40 include non-continuous apertures 102 and 104 respectively. Apertures 104 in second rotatable member 40 are positioned radially outwardly of a point equidistantly between apertures 102 in first rotatable member 30. Lines of magnetic flux 68 (not illustrated) generated by electromagnet 86 first exit rigid shell 90 and travel a path across gap 88 into first rotatable member 30. Flux 68 then travels a path of least resistance through a plurality of bridge portions 106 (as seen in FIG. 8) located between apertures 102 until a level of saturation is reached. Upon saturation, flux 68 follows the next path of least resistance and traverses gap 66 into second rotatable member 40 through working surfaces 93. Upon entry into second rotatable member 40, flux 68 saturates a plurality of bridge portions 108 (as seen in FIG. 8) located between apertures 104 until a level of saturation is reached. Provided the width of apertures 102 and 104 are greater than the width of gap 66, lines of magnetic flux 68 traverse gap 66 through working surfaces 58. The process of traversing gap 66 is repeated until the number of apertures 102 and 104 is exhausted. The path is completed as flux 68 traverses gap 66 and gap 88 and reenters rigid shell 90 of electromagnet 86. In this embodiment, an annular sealing element 72a includes a cylindrical retaining portion 78a that cooperates with a annular groove 80a to retain annular sealing element 72a. Cylindrical retaining portion 78a further serves the purpose of inhibiting the escape of the magnetically reactive medium from apertures 104 in second rotatable member 40. Similarly, a cylindrical retaining member 109 is fixedly attached to inner surface 34 of first rotatable member 30 and serves the purpose of inhibiting the escape of the magnetically reactive medium from apertures 102 in first rotatable member 30.

Figure 9:
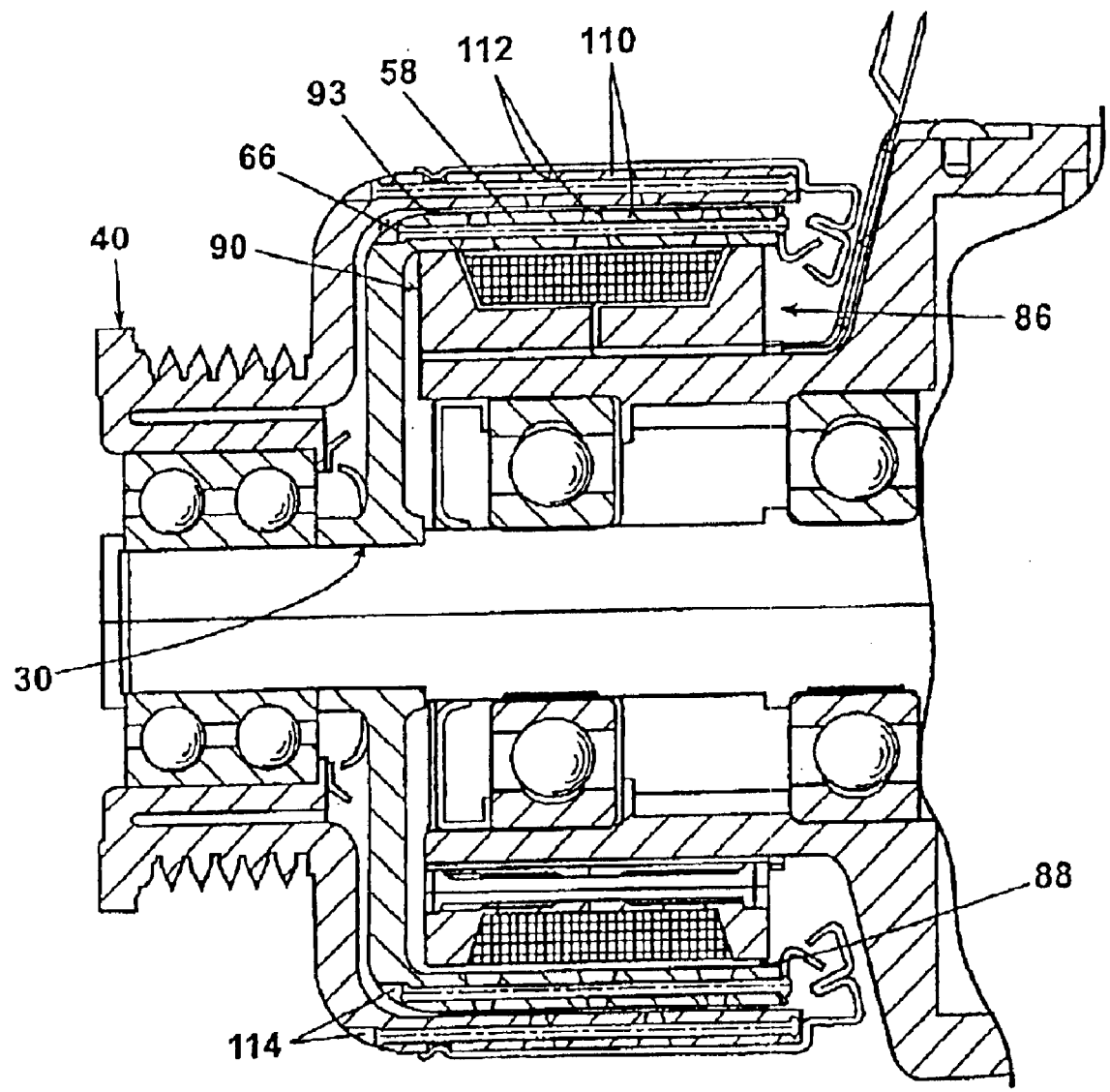
FIG. 9 is a cross-sectional view of another embodiment of a magnetic particle device.

FIG. 9 is a cross-sectional view of a fifth embodiment of the present invention. In this embodiment, the first rotatable member 30 and second rotatable member 40 include a plurality of alternating continuous magnetic rings 110 and continuous non-magnetic rings 112. Magnetic rings 110 and non-magnetic rings 112 are secured to rotatable members 30 and 40 by a plurality of fasteners 114, although the method of securing rings 110 and 112 is not intended to be limited thereto. The rings are positioned such that non-magnetic rings 112 in second rotatable member 40 are positioned radially outwardly of a point equidistantly between non-magnetic rings 112 in first rotatable member 30. Fasteners 114, like non-magnetic rings 112, are preferred to be of a non-magnetic material, such as aluminum or stainless steel. Upon excitation of electromagnet 86, lines of magnetic flux 68 (not illustrated) first exit rigid shell 90 and follow a path of least resistance by traversing gap 88 into first rotatable member 30. Upon entry into first rotatable member 30, the continuous non-magnetic rings 112 prevent flux 68 from short-circuiting through first rotatable member 30. Therefore, flux 68 follows a path of least resistance and traverses gap 66 through working surfaces 93 into second rotatable member 40. Upon entry into second rotatable member 40, flux 68 travels a path through second rotatable member 40 until flux 68 encounters continuous non-magnetic ring 112 and is forced to traverse gap 66 through working surfaces 58. The process of traversing gap 66 is repeated until the number of continuous non-magnetic rings 112 is exhausted. The path is completed as flux 68 traverses gap 66 and gap 88 and reenters rigid shell 90 of electromagnet 86.

The magnetic particle device 10 of present invention is a torque transfer device in which portions of an input member 40 and an output member 30 are provided with regions of relatively high magnetic permeability and regions of relatively low magnetic permeability. These regions of relatively high and low magnetic permeability are positioned to form a flux path through which lines of magnetic flux, generally denoted by element number 68, travel. As described above, the regions of relatively low magnetic permeability are formed by introducing non-magnetic materials, such as stainless steel, aluminum or a polymer, into input and output members 40, 30 or by removing material from input and output members 40, 30 to form a cavity or groove. In the embodiment illustrated in FIG. 1, the regions of relatively low magnetic permeability include annular grooves located in input and output members 40, 30. The grooves may be positioned in the inner or outer surfaces of input and output members 40, 30 or, alternatively, in both the inner and outer surfaces of the input and output members 40, 30. In the embodiment illustrated in FIG. 9, the regions of relatively low magnetic permeability include non-magnetic rings of metal such as stainless steel. In the embodiment illustrated in FIG. 7, the regions of relatively low magnetic permeability include circumferentially extending, non-continuous apertures located in input and output members 40, 30.

The input and output members 40, 30 of magnetic particle device 10 preferably include multiple regions of relatively high and low magnetic permeability. However, device 10 may be configured to include any number of alternating regions of high and low magnetic permeability with the most basic configuration being at least one region of relatively low magnetic permeability in output member 30 and at least one region of relatively low magnetic permeability in input member 40. The at least one region of relatively low magnetic permeability in output member 30 is provided to prevent lines of magnetic flux 68 from "short-circuiting" through output member 30.

In operation, the traversing lines of magnetic flux 68 activate magnetically reactive medium 64. The magnetically reactive particles 65 in medium 64 change formation, in relation to the intensity of the magnetic field, by aligning with lines of magnetic flux 68 as flux 68 traverses gap 66. Magnetically reactive particles 65 under the influence of a magnetic field will lock into chains 100 increasing the shear force and creating a mechanical friction against input member 40 and output member 30. The increased shear force and mechanical friction results in a corresponding transfer of torque between input member 40 and output member 30 that is precisely controlled in relation to the strength of the applied magnetic field.

As will be appreciated, the present invention can transfer a given amount of torque between input and output members 40, 30 with a weaker magnetic field due to the greater amount of activated medium 64. Thus, increasing the number of regions of relatively high and low magnetic permeability permits the use of a smaller source of magnetic flux to provide, inter alia, a substantial weight savings over conventional torque transferring devices.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A torque transfer device, comprising:
   an input member for receiving torque from an external source, said input member having at least one region of relatively high magnetic permeability and at least one region of relatively low magnetic permeability;
   an output member disposed radially inward of said input member to define a torque transferring region therebetween, said output member having at least one region of relatively high magnetic permeability and at least one region of relatively low magnetic permeability;
   a source of magnetic flux; and
   wherein said magnetic flux is forced to travel a weaving path substantially between said regions of relatively low magnetic permeability, traversing said torque transferring region to activate said torque transferring region and permit transfer of torque between said input and output members.

2. The torque transfer device of claim 1, wherein said torque transferring region is defined by a gap containing a magnetically reactive medium.

3. The torque transfer device of claim 1, wherein said source of magnetic flux includes an electromagnet.

4. The torque transfer device of claim 3, wherein said source of magnetic flux includes a permanent magnet.

5. The torque transfer device of claim 4, wherein said permanent magnet is supplemented by said electromagnet.

6. The torque transfer device of claim 1, wherein said regions of relatively low magnetic permeability include a non-magnetic ring.

7. The torque transfer device of claim 1, wherein said regions of relatively low magnetic permeability include a groove.

8. The torque transfer device of claim 1, wherein said regions of relatively low magnetic permeability include an aperture.

9. The torque transfer device of claim 1, wherein said regions of relatively low magnetic permeability include at least one of a non-magnetic ring, a groove and an aperture.

10. The torque transfer device of claim 1, wherein the source of magnet flux is selectively controllable to provide a variable level of magnetic flux.

11. A magnetic particle device comprising:
    a stationary housing member having a duct therethrough for receiving a rotatable shaft, said rotatable shaft having a first rotatable member mounted thereon;
    a second rotatable member positioned radially outwardly of said first rotatable member, said first and second rotatable members cooperating to define a gap therebetween, said gap containing a magnetically reactive medium;
    a source of magnetic flux;
    said first rotatable member and said second rotatable member including regions of relatively high and low magnetic permeability, said regions of relatively low magnetic permeability positioned to create a working surface therebetween; and
    wherein said magnetic flux is forced to travel a weaving path substantially between said regions of relatively low magnetic permeability, traversing said gap substantially through said working surface so as to magnetize said magnetically reactive medium and transform said magnetically reactive medium into a torque transmitting coupling to permit the transfer of torque between said first and second rotatable members.

* * * * *